United States Patent [19]

Huggins

[11] Patent Number: 5,185,458
[45] Date of Patent: Feb. 9, 1993

[54] PALLADIUM-CONTAINING CATALYST PREPARATION

[75] Inventor: John Huggins, Leverkusen, Fed. Rep. of Germany

[73] Assignee: Bayer Aktiengesellschaft, Leverkusen, Fed. Rep. of Germany

[21] Appl. No.: 717,743

[22] Filed: Jun. 19, 1991

[30] Foreign Application Priority Data

Jun. 29, 1990 [DE] Fed. Rep. of Germany ....... 4020689

[51] Int. Cl.$^5$ .......................... C07F 15/00; C07F 7/00
[52] U.S. Cl. ......................................... 556/9; 556/10; 556/12; 556/136
[58] Field of Search ........................ 556/9, 10, 12, 136

[56] References Cited

U.S. PATENT DOCUMENTS 3,485,857 12/1969 Speier ................................... 260/429
4,143,057 3/1979 Weinberg et al. .............. 260/429 R
4,847,228 7/1989 Saruyama ............................ 502/158

FOREIGN PATENT DOCUMENTS 0180801 5/1986 European Pat. Off. .
0298327 1/1989 European Pat. Off. .
2068988 8/1981 United Kingdom .................. 556/10
2092017 11/1982 United Kingdom .

OTHER PUBLICATIONS

Stern et al., Journal of Catalysis, vol. 27, pp. 120–133 (1972).

*Primary Examiner*—Jose G. Dees
*Assistant Examiner*—Porfirio Nazario
*Attorney, Agent, or Firm*—Sprung Horn Kramer & Wood

[57] ABSTRACT

The present invention relates to a catalyst preparation produced from a palladium(II) compound and a functional siloxane, in which the functional siloxane contains on average at least one reactive group per molecule.

7 Claims, No Drawings

PALLADIUM-CONTAINING CATALYST PREPARATION

BACKGROUND OF THE INVENTION

This invention relates to a homogeneous, liquid palladium-containing catalyst preparation which is soluble in apolar media.

Transition metal catalysts based on palladium are known for the hydrogenation of aliphatically unsaturated carbon-carbon bonds and for the reduction of various functional organic groups, for example aldehyde, keto and nitro groups, with hydrogen. The palladium is normally used in heterogeneous form on a support material. Example are palladium on active carbon, barium sulfate or calcium carbonate, as described in Rylander ("Catalytic Hydrogenation in Organic Synthesis", Academic Press; New York, 1979, pages 1–22, 33–34).

Soluble palladium-containing hydrogenation catalysts are less well-known. Stern and Maples (*Journal of Catalysis*, Vol. 27, (1972), 120–133) describe the hydrogenation of unsaturated organic compounds with Pd(O) complexes of the $(L)_3Pd_2$ or $(L)PdCl_2$ type $(L=Ph_2P-(CH_2)_n-PPh_2)$. Sisak, Jablonkai and Ungvary (*Acta Chimica Adademiae Scientiarum Hungaricae*, Vol. 103 (1980), 33–42) describe the hydrogenation of dienes and alkynes with $(DMF)_2PdCl_2$ (DMF=dimethyl formamide). Other catalysts of the $(L)_2PdCl_2$ type $(L=PPh_3$ or dimethyl sulfoxide) are also mentioned. These catalysts are preferably used in polar organic solvents, such as DMF.

However, these catalysts have disadvantages. The palladium(O) compounds are sensitive to atmospheric oxygen wile the palladium(II) compounds are not sufficiently soluble for use in apolar media.

Important apolar media are apolar liquids, such as hexane, tolune or diethyl ether and cyclic, linear and/or branched siloxanes. Solubility in apolar liquids where hydrogenation is carried out in the absence of solvents is also desirable. For example, adequate solubility is also necessary in the hydrogenation of vinyl-containing siloxanes or in the production of hydrogen-absorbing polysiloxane preparations, as described in GB 2,167,424 A.

Accordingly, the object of the present invention was to provide highly effective and soluble catalysts for hydrogenation in apolar media.

DESCRIPTION OF THE PREFERRED EMBODIMENTS

According to the present invention, it has surprisingly been found that certain palladium compounds, which are only slightly soluble in apolar media, can be converted into a soluble form by reaction with functional siloxanes. In a preferred embodiment, the present invention relates to a catalyst preparation produced from a palladium(II) compound and a functional siloxane, in which the functional siloxane contains on average at least one reactive group per molecule.

The palladium compound according to the invention corresponds to formula (1)

$$PdX_2 \qquad (1)$$

in which
X = —Cl, —Br or $O_2CR_1$ and
$R_1$ = alkyl, cycloalkyl, aryl or fluorinated alkyl groups containing 1 to 20 carbon atoms.

In a preferred embodiment, the compound is a complex of an organic carboxylic acid, of which examples are palladium(II) acetate or palladium(II) trifluoroacetate.

The functional siloxane may be a cyclic, linear or branched siloxane containing a number of reactive groups. The typical functional siloxanes has a viscosity of 2 to 2,000,000 mPa.s at 25 C. Linear dimethyl siloxanes having viscosities of 3 to 20,000 mPa.s or cyclic siloxanes containing an average of 4 to 10 siloxy units per molecule are particularly preferred. In the preferred embodiment, the reactive groups may have the following structures (2) to (4)

  (2)

  (3)

  (4)

in which
the functional substituent R contains a primary, secondary or tertiary amino, pyridyl, vinyl or allyl structure. Particularly preferred functional substituents are those having the structure (5)

$$R^3{}_2N(CH_2)_n— \qquad (5)$$

in which
$R^3$ is a hydrogen atom or an alkyl, cycloalkyl or aryl group containing no more than 15 carbon atoms and n has a value of 1 to 4. Other preferred functional substituents are those which contain an unsaturated organic radical having the structure (6)

$$CH_2=CH(CH_2)_m— \qquad (6)$$

in which
m = 0 to 13.

Examples are 3-aminopropyl, 4-aminobutyl, N-(2-aminoethyl)-3-aminopropyl, 3-(cyclohexylamino)-propyl, (cyclohexylamino)-methyl, vinyl or allyl.

The production of the catalyst preparations according to the invention is preferably carried out in the presence of an inert organic medium which is liquid under normal conditions and in which the palladium compound and/or the functional siloxane is soluble or dispersible. Examples of such media are aromatic hydrocarbons and halogenated aromatic hydrocarbons, various oxygen-containing organic compounds, such as ethylene glycol dialkyl ether, acetic acid or tetrahydrofuran, and also halogenated saturated hydrocarbons, for example methylene chloride or chloroform.

The catalyst preparations may also be prepared in the absence of solvents.

In one preferred embodiment, the palladium compound is reacted with the functional siloxane in the presence of an organic solvent at temperatures of about 20° C. to below the decomposition temperature of the reactants. In a particularly preferred embodiment, the reaction is carried out at room temperature. The production of the catalyst preparations may take place over periods ranging from a few minutes to several hours.

If other palladium compounds, for example palladium(II) acetylacetonate, or siloxanes containing no reactive groups are used, no reaction takes place and, after removal of the solvent, the palladium compound precipitates in solid form.

Where the catalyst preparations according to the invention are used, hydrogenation reactions are carried out under the conditions normally applied where known catalysts are used. In contrast to the known catalysts, palladium is present in soluble form in the catalyst preparations according to the invention. The hydrogenation reactions may be carried out in the presence or absence of solvents. By virtue of the outstanding solubility of these preparations, it is even possible to effectively use apolar organic solvents and reactants with the catalyst.

In the practical application of these catalyst preparations, aliphatic unsaturated carbon-carbon bonds may be hydrogenated or various functional organic groups, for example aldehyde, keto and nitro groups, may be reduced.

In addition, hydrogenation can be selective in many cases, i.e. aliphatic multiple bonds can be hydrogenated while the functional groups remain intact or vice versa.

The catalyst preparations according to the invention are illustrated in the following Examples.

EXAMPLES

Example 1

1.5 g palladium(II) acetate and 30 ml toluene are introduced into a 100 ml three-necked flask equipped with a condenser, thermometer and magnetic stirrer. The mixture is heated for 1 hour to 40° C. until the palladium(II) acetate has completely dissolved. 20 g of a polydimethyl siloxane containing 0.82 mmol/g (cyclohexylamino)methyl dimethylsiloxy groups and having a viscosity of 55 mPa.s (25° C.) are added to the resulting solution. After 2 hours, the toluene is removed at 30° C./5 mbar. The catalyst preparation is obtained in the form of a light brown, clear liquid containing 3.37% by weight palladium in a quantity of 21 g.

Example 2

531 mg palladium(II) acetate and 20 ml toluene are introduced into a three-necked flask of the type described in Example 1. The palladium(II) acetate is dissolved at 40° C., after which 20 g of a polydimethylsiloxane containing (cyclohexylamine) methyl dimethylsiloxy and (cyclohexylamine) methyl (methyl)siloxy groups, in all 0.71 mmol NH/g, and having a viscosity of 200 mPa.s (25° C.) in 30 ml toluene are added to the resulting solution. After 3 hours at 40° C., the toluene is removed at 40° C./5 mbar. The catalyst is obtained in the form of a yellow, clear liquid containing 1.31% by weight palladium in a quantity of 19 g.

Example 3

A mixture of 730 mg palladium(II) chloride and 30 ml methylene chloride is first stirred for 8 h at 40° C. in a three-necked flask of the type described in Example 1. 20 g of a polydimethyl siloxane containing (cyclohexylamine) methyl dimethylsiloxy and (cyclohexylamine) methyl (methyl)siloxy groups, in all 0.71 mmol NH/g, and having a viscosity of 200 mPa.s (25° C.) are then added. The mixture is stirred for another 16 hours at 40° C. and is subsequently filtered. The methylene chloride is removed at 30° C./30 mbar. The catalyst is obtained in the form of a dark brown, clear liquid containing 2.06% by weight palladium in a quantity of 20 g.

Example 4

211 mg palladium(II) acetate in 50 g methylene chloride are dissolved at 25° C. in a 100 ml flask equipped with a magnetic stirrer. 20 g tetramethyl tetravinyl cyclotetrasiloxane are added to the resulting solution, followed by stirring for 24 h. The initially red solution turns slightly yellowish in color. The methylene chloride is removed at 25° C./30 mbar. The catalyst is obtained in the form of a light yellow, clear liquid containing 0.52% by weight Pd in a quantity of 19 g.

Example 5

224 mg palladium(II) acetate, 2 g acetic acid and 20 g 1,3,5,7-tetramethyltetravinylcyclotetrasiloxane are introduced into a 100 ml one-necked flask equipped with a magnetic stirrer. A homogeneous, yellow-green solution is formed after 4 days at 25° C.

The volatile components are distilled off at 40° C./5 mbar. The catalyst is obtained in the form of a light yellow, clear liquid containing 0.51% by weight Pd in a quantity of 20 g.

Example 6

This Example is intended to show that other palladium(II) complexes which do not correspond to the invention do not form soluble catalyst preparations in the above reactions.

304 mg palladium(II) acetylacetonate and 20 ml toluene are introduced into a 50 ml three-necked flask equipped with a condenser, thermometer and magnetic stirrer. The palladium(II) acetylacetonate is dissolved at 80° C., after which 10 g of a polydimethylsiloxane containing (cyclohexylamine)methyldimethylsiloxy and (cyclohexylamine) methylsiloxy groups, in all 0.71 mmol NH/g, and having a viscosity of 200 mPa.s (25° C.) are added to the resulting solution. After 3 hours at 80° C., the toluene is removed at 80° C./5 mbar. The palladium complex precipitates in solid form.

Example 7

The following Example is intended to show that nonfunctional polydimethyl siloxanes do not form soluble catalyst preparations in the above reactions.

225 mg palladium(II) acetate and 20 ml toluene are introduced into a 50 ml three-necked flask equipped with a condenser, thermometer and magnetic stirrer. The palladium(II) acetate is dissolved at 40° C. and 50 mg of a trimethylsiloxy-terminated polydimethylsiloxane having a viscosity of 50 mPa.s (25° C.) are added to the resulting solution. After 3 hours at 40° C., the toluene is removed. The palladium complex precipitates in solid form.

Example 8

1.5 g of a vinyl dimethylsiloxy-terminated polydimethylsiloxane having a viscosity of 11 mPa.s (25° C.) and containing a total of 1.8 mmol/g SiCH=CH$_3$ and 17.5 mg of the catalyst preparation of Example 2 are introduced into a 25 ml one-necked flask equipped with a magnetic stirrer. The flask is connected to a hydrogenation apparatus, evacuated three times and purged with nitrogen and the uptake of gas is observed at room temperature. Initially, 4.4 ml/h hydrogen are absorbed. After the hydrogen uptake has ceased, the flask is vented and the siloxane is investigated by $^1$H NMR. Quantitative hydrogenation of the vinylsiloxy groups to ethylsiloxy groups is found.

Examples 9–19

In the hydrogenation apparatus described in Example 8, compounds containing unsaturated carbon-carbon bonds are hydrogenated and the uptake of hydrogen is observed at room temperature. The results are shown in Table 1.

TABLE 1

| Example | Compound type | g | Catalyst Example | mmol Pd | ml/h |
|---|---|---|---|---|---|
| 9 | 1-Octene | 50 | 1 | 0.1 | 3.9 |
| 10 | " | 50 | 2 | 0.1 | 22 |
| 11 | " | 50 | 3 | 0.1 | 3.2 |
| 12 | " | 50 | 4 | 0.1 | 48 |
| 13 | Vinyl siloxane* | 50 | 1 | 0.1 | 2.3 |
| 14 | Vinyl siloxane* | 50 | 2 | 0.1 | 1.1 |
| 15 | Vinyl siloxane* | 50 | 3 | 0.1 | 1.0 |
| 16 | Vinyl siloxane* | 50 | 4 | 0.1 | 1.9 |
| 17 | Vinyl siloxane* | 50 | 5 | 0.1 | 0.83 |
| 18 | D(Me,Vi)$_4$[b] | 50 | 1 | 0.1 | 1.0 |
| 19 | " | 50 | 4 | 0.1 | 1.5 |

*Vinyldimethyl-terminated polydimethylsiloxane containing 1.8 mol/g (SiCH=CH$_2$)
[b]Tetramethyltetravinylcyclotetrasiloxane It is understood that the specification and examples are illustrative but not limitative of the present invention and that other embodiments within the spirit and scope of the invention will suggest themselves to those skilled in the art.

What is claimed is:

1. A palladium-containing catalyst preparation produced by the reaction of a palladium (II) compound corresponding to formula I $$PdX_2 \qquad (I)$$

in which
X=—Cl, —Br or O$_2$CR$_1$ and
R$_1$=alkyl, cycloalkyl, aryl or fluorinated alkyl groups containing 1 to 20 carbon atoms, with a functional siloxane containining on average at least one reactive group per molecule wherein the functional siloxane has a viscosity of 2 to 2,000,000 mPa.s at 25° C. and is made up of cyclic, linear or branched structures and combinations thereof.

2. A catalyst preparation produced in accordance with the process of claim 1, wherein the palladium(II) compound reacted is palladium (II) acetate or palladium(II) trifluoroacetate.

3. A catalyst preparation produced in accordance with the process of claim 1, wherein the palladium(II) compound reacted is palladium (II) acetate or palladium(II) chloride.

4. A catalyst preparation produced in accordance with the process of claim 1, wherein the functional siloxane reacted contains on average at least one primary, secondary or tertiary amino group per molecule.

5. A catalyst preparation produced in accordance with the process of claim 1, wherein the functional siloxane reacted contains at least one functional group corresponding to formula II, III or IV per molecule.

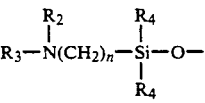

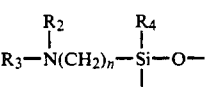

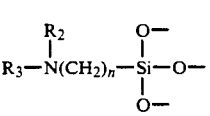

in which
R$_2$ and R$_3$ represent hydrogen or an alkyl, cycloalkyl or aryl radical containing no more than 15 carbon atoms and R$_4$ is methyl or phenyl and n=1 to 4.

6. A catalyst preparation produced in accordance with the process of claim 1, wherein the functional siloxane reacted contains one or more silicon-bound vinyl, allyl or other unsaturated organic groups containing 3 to 20 carbon atoms.

7. A catalyst preparation produced in accordance with the process of claim 1, wherein the functional siloxane reacted is tetramethyltetravinylcyclotetrasiloxane.

* * * * *